US009143948B2

(12) United States Patent
Ronneke et al.

(10) Patent No.: US 9,143,948 B2
(45) Date of Patent: Sep. 22, 2015

(54) METHOD AND NODE FOR MEASURING PROCESSING POWER IN A NODE IN A COMMUNICATIONS NETWORK

(75) Inventors: Hans Ronneke, Kungsbacka (SE); Joakim Hallberg, Vastra Frolunda (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 286 days.

(21) Appl. No.: 13/598,973

(22) Filed: Aug. 30, 2012

(65) Prior Publication Data

US 2013/0058236 A1    Mar. 7, 2013

(51) Int. Cl.
*H04W 16/22* (2009.01)
*H04W 24/08* (2009.01)
*H04W 4/00* (2009.01)
*H04W 24/10* (2009.01)
*H04L 12/26* (2006.01)
*H04W 8/02* (2009.01)
*H04W 60/00* (2009.01)
*H04W 92/14* (2009.01)

(52) U.S. Cl.
CPC .............. *H04W 16/22* (2013.01); *H04W 4/005* (2013.01); *H04W 24/08* (2013.01); *H04L 43/062* (2013.01); *H04W 8/02* (2013.01); *H04W 24/10* (2013.01); *H04W 60/00* (2013.01); *H04W 92/14* (2013.01)

(58) Field of Classification Search
CPC ... H04W 24/10; H04W 72/042; H04W 36/00; H04W 36/22; H04W 4/22; H04W 52/0212; H04W 52/0235; H04W 56/00; H04W 72/0413; H04W 72/082; H04W 72/085
USPC ......... 370/329, 252, 311, 254, 312, 331, 458, 370/232, 241, 242; 709/206, 224, 203, 208, 709/213, 221
See application file for complete search history.

(56) References Cited

FOREIGN PATENT DOCUMENTS

WO    WO 2011/037508 A1 *   3/2011

* cited by examiner

*Primary Examiner* — Un C Ho
*Assistant Examiner* — Oussama Roudani
(74) *Attorney, Agent, or Firm* — Rothwell, Figg, Ernst & Manbeck, P.C.

(57) ABSTRACT

The embodiments herein relate to a method in a first network node for measuring processing power in a second network node in a communications network. The first network node obtains a signaling load value associated with a procedure, which procedure is triggered by a message. Based on the obtained signaling load value, the first network node measures the processing power of the second network node.

25 Claims, 6 Drawing Sheets

METHOD AND NODE FOR MEASURING PROCESSING POWER IN A NODE IN A COMMUNICATIONS NETWORK

CROSS-REFERENCE TO RELATED APPLICATION

This application claims priority under 35 U.S.C. Section 119(a) to PCT/EP2011/064899 filed Aug. 30, 2011, which is incorporated herein by reference in its entirety.

TECHNICAL FIELD

Embodiments herein relate generally to a first network node and a method in the first network node. More particularly the embodiments herein relate to measuring processing power in a second network node in the communications network.

BACKGROUND

A typical communications network or system is a collection of User Equipments (UE), links and network nodes which together enable communication between the user equipments. In the communications network, which also may be referred to as cellular network, the user equipments, communicate via a Radio Access Network (RAN) to one or more core networks (CN).

A user equipment is a mobile terminal by which a subscriber may access services offered by an operator's core network and services outside the operator's network to which the operator's RAN and CN provide access. User equipments are enabled to communicate wirelessly in the cellular network. The user equipments may be for example communication devices such as mobile telephones, cellular telephones, laptops with wireless capability, machine-to-machine devices, or embedded devices in other electronic equipment. The user equipments may be portable, pocket-storable, hand-held, computer-comprised, or vehicle-mounted mobile devices, enabled to communicate voice and/or data, via the radio access network, with another entity, such as another user equipment or a server.

The communications network covers a geographical area which is divided into cell areas. Each cell area is served by a base station, e.g. a Radio Base Station (RBS), which sometimes may be referred to as e.g. evolved Node B (eNB), eNodeB, NodeB, B node, or Base Transceiver Station (BTS), depending on the technology and terminology used. A cell is a geographical area where radio coverage is provided by the base station at a base station site. Each cell is identified by an identity within the local radio area, which is broadcast in the cell. The base stations communicate over the air interface operating on radio frequencies with the user equipments within range of the base stations In some versions of the radio access network, several base stations are typically connected, e.g. by landlines or microwave, to a Radio Network Controller (RNC), as in $3^{rd}$ Generation (3G), i.e. Wideband Code Division Multiple Access (WCDMA). The radio network controller supervises and coordinates various activities of the plural base stations connected thereto. In $2^{nd}$ Generation (2G), i.e. Global System for Mobile Communications (GSM), the base stations are connected to a Base Station Controller (BSC). The network controllers are typically connected to one or more core networks.

Machine-to-Machine (M2M) is a term referring to technologies that allow both wireless and wired systems to communicate with other devices of the same ability, for example computers, embedded processors, smart sensors, actuators and mobile devices may communicate with one another, take measurements and make decisions, often without human intervention. Machine Type Communication (MTC) may be seen as a form of data communication between entities that do not necessarily need human interaction. M2M traffic is, for example, used in applications such as electricity meters, home alarms, signaling from vehicles, such as e.g. cars, trucks etc.

There exists a clear industry consensus that mobile machine-to-machine communications will play an increasingly prominent role in carrier networks and Information Technology (IT) operations. It may be predicted that there will be 50 billion wirelessly connected devices by the year of 2020. These devices may be connected via GSM, High Speed Packet Access (HSPA) and Long Term Evolution (LTE), and will be used for both machine-to-machine applications and connected consumer devices.

It is commonly believed that M2M communication will be applied in a long range of very different areas with completely different communication requirements and patterns. Some electricity meter applications may for example connect and communicate just a few bytes of data only once a month, whereas other applications such as video surveillance may be constantly connected and transfer Gigabyte of data every hour. Connecting M2M devices with such different communication patterns to the same infrastructure as is used for normal human-to-human (H2H) communication puts new challenges on the communication equipment. New 3rd Generation Partnership Project (3GPP) requirements related to M2M communication have been specified to try to address some of these challenges. A service optimized for machine type communications is different from a service optimized for H2H communications. Machine type communications is different from current mobile network communication services as it may involve:

different market scenarios,
data communications,
lower costs and effort,
a potentially very large number of communicating user equipments with,
for many applications, little traffic per user equipment.

M2M devices, also referred to as MTC devices, that do not move, move infrequently, or move only within a certain region may be associated with a feature called "low mobility". A requirement for low mobility may be that the network operator may be able to change the frequency of mobility management procedures or simplify mobility management per M2M device. Another requirement may be that the network operator may be able to define the frequency of location updates performed by the M2M device. M2M devices that are expected to send or receive data infrequently, i.e. with long period between two data transmission, may be associated with a feature called infrequent transmission. For the infrequent transmission, the network shall establish a resource only when transmission occurs.

One serious problem with connecting M2M devices with new communication patterns to the same infrastructure as is used for H2H communication is how the model for dimensioning of network nodes are currently designed. The state-of-the-art is that the dimension of a communication node is often based on the number of served user equipments and/or the number connections the node may handle. Another problem relating to connecting M2M devices with new communication patterns to the same infrastructure as is used for H2H communication is how the price model and licensing of network nodes are currently designed. The price of a communication node is may also be based on the number of served user equipments and/or the number connections the node may handle. This is also naturally related to the Average Revenue Per User (ARPU) which is an important measure for operators.

When looking closer at what resources user equipments and connections consume in the network, it is found that they consume two types of resources, memory resources and processing resources. The network equipment may also be referred to as a communication node or network node. Memory resources in the network node are used to store certain parameters related to a user equipment that is registered in the node, i.e. the network, or related to a connection that is established in the node, i.e. in the network. Processing resources are needed when the state of user equipments or connections are changed, e.g. registering a user equipment in the network/node or deregistering a user equipment, establishing a new connection or removing it, changing the state of a connection from idle to connected, or vice versa, or changing the current location of a registered user equipment etc. Processing resources are also needed for some other purposes, e.g. regularly checking the reachability of a user equipment/terminal, or notifying the user equipment or network of certain events such as that someone wants to communicate with it.

When dimensioning the hardware for a communication/network node, in general the amount of required memory resources and processing resources need to be decided. This is usually done by trying to define a "typical user equipment". This is accomplished by a "traffic model", which defines e.g. how many registrations/deregistrations a typical user equipment does per day, how many times per hour it initiates communication, how much the typical user equipment moves between different cells and mobility areas etc. Through the traffic model, the balance between memory and processing resources will be known, and hence the hardware may be properly dimensioned. When the hardware is dimensioned the price may be set based on the number of user equipments and/or connections that the node may serve. When a traffic model is used as a base for node dimensioning and pricing/licensing, there will be a certain balanced relation between memory and processing resources.

A problem with connecting M2M devices to the same infrastructure as H2H user equipments is that there is no "typical user equipment" for M2M. They are expected to span over a wide range of different communication behaviors. Optimization for M2M that is being done in 3GPP has made this span even larger. Therefore it becomes very difficult to use "traffic models" as a base for hardware dimensioning and therefore also for price/license models. A more flexible approach for dimensioning of network nodes is therefore required.

Some M2M areas, often with "low activity" communication patterns, are also expected to be cost sensitive. It is therefore important that the price/license models are flexible enough, so that they don't prohibit such M2M communication to use the 3GPP infrastructures.

The growing use of Smart Phones has to some extent also put requirements on changed or more flexible traffic models, but with the expected growth of M2M devices the problem is growing critical.

In addition to memory and processing resources, the hardware of a communication node that handles payload, i.e. forwards IP packets, is also dimensioned based on its packet forwarding capacity measured in Packets Per Second (PPS), or simply its throughput capacity measured in Giga- or Terabit per second. In some embodiments, a communication node may also be priced based on its packet forwarding capacity measured in Packets Per Second (PPS), or simply its throughput capacity measured in Giga- or Terabit per second. However, since the hardware for payload handling is normally quite separate from the hardware resources described above, it may to a certain extent be dimensioned and priced separately.

SUMMARY

An objective of embodiments herein is therefore to obviate at least one of the above disadvantages and to provide flexible dimensioning of a network node.

According to a first aspect, the objective is achieved by a method in a first network node for measuring processing power in a second network node in a communications network. The first network node obtains a signaling load value associated with a procedure. The procedure is triggered by a message. The first network node measures the processing power of the second network node based on the obtained signaling load value.

According to a second aspect, the objective is achieved by a first network node for measuring processing power in a second network node in a communications network. The first network node comprises an obtaining unit configured to obtain a signaling load value associated with a procedure. The procedure is triggered by a message. The second network node further comprises a measuring unit configured to measure the processing power of the second network node in the communications network based on the obtained signaling load value.

Thanks to the signalling load value, which is tied to the processing resource utilization in the second network node, and flexible dimensioning of the second network node is achieved, in addition to a way to measure the resource utilization in the second network node.

Embodiments herein afford many advantages, of which a non-exhaustive list of examples follows:

The embodiments herein provide an advantage of an easy and flexible way of measuring the true processing power capacity of a complex communication node with a large number of very different processing tasks.

By decoupling memory resources and processing resources, dimensioning flexibility may be achieved. The dimensioning model may accommodate different usage behaviors and usage patterns in a flexible way. It may for example be possible for low activity cost sensitive M2M applications to use 3GPP infrastructure as their communication means with a relatively smaller amount of processing power and infrastructure cost for the mobile operator. In some embodiments, this is also applicable to a price/license model of the second network node.

Another advantage is that the vendor is relieved from the responsibility of maintaining an adequate node dimensioning that fits any used traffic model. Instead that responsibility is shifted to the user of the node, e.g. the operator, who monitors utilization of the two resources separately and takes action, e.g. increases the network node capacity, when any one of the two resources reaches its capacity limit.

It is further an advantage that the vendor may more easily provide products or nodes that are dimensioned for different usages. For example a network node dimensioned and tailored for "low activity" M2M devices that may hold ten times more registered users or connections would be possible using the same dimensioning model, and also using the same pricing/licensing model. Since node dimensioning does not need to be based on a traffic model, and since the user of the node ensures himself that processing and memory resources both and independently are kept below the capacity limit, the vendor can offer a different or a tailored node configurations with fair pricing/licensing regardless of the network node configuration.

Another advantage is that the embodiments herein are usefulness for addressing the capacity problems related to smart phones.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

DETAILED DESCRIPTION

Figure 1:
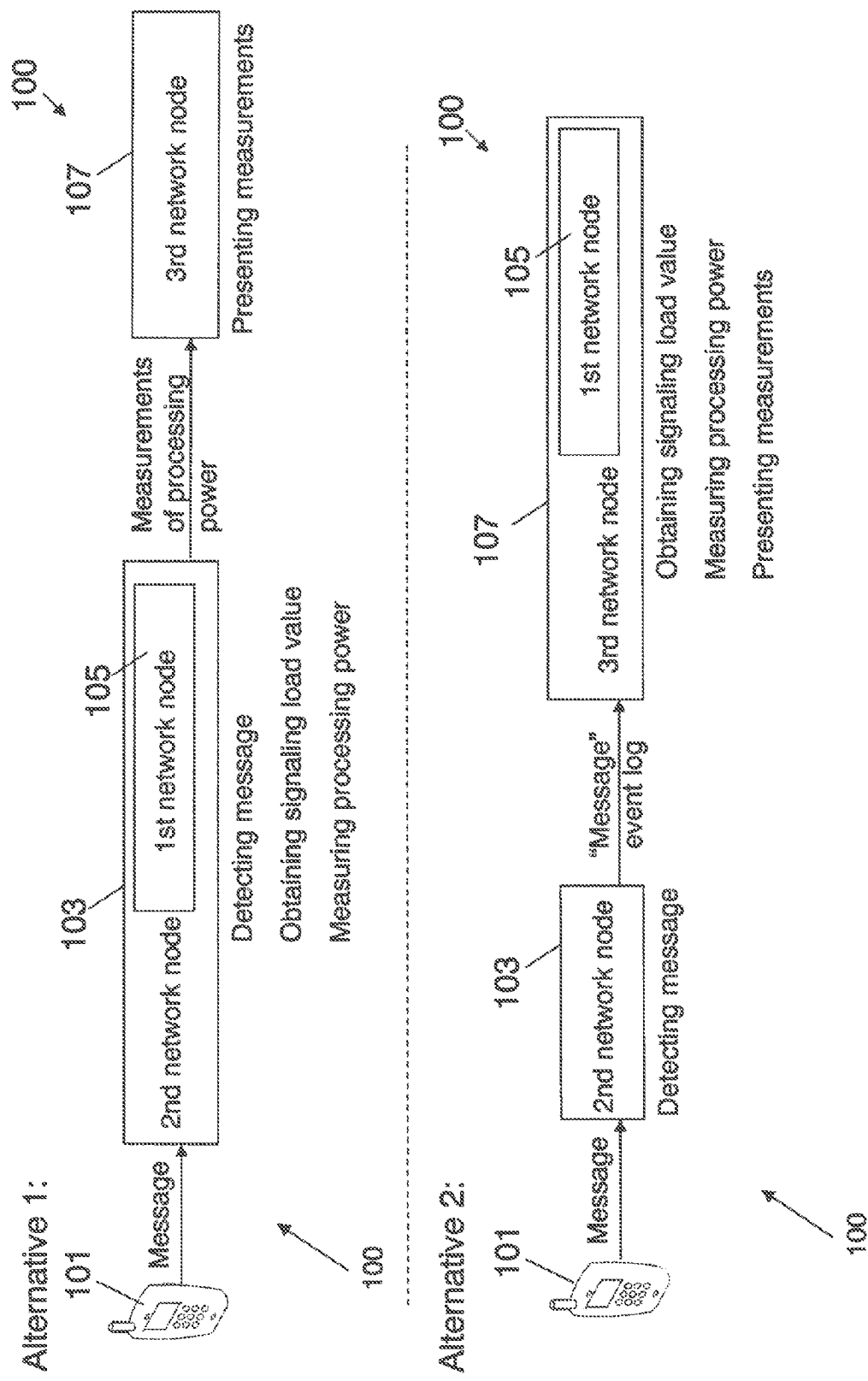
FIG. 1 is a schematic block diagram illustrating embodiments of a communications network.

FIG. 1 depicts a communications network 100 in which embodiments herein may be implemented. The communications network 100 may in some embodiments apply to one or more radio access technologies such as for example LTE, LTE Advanced, WCDMA, GSM, or any other 3GPP radio access technology. It may also apply to other existing or future radio access technologies, e.g. Wireless Local Area Network (WLAN), Code Division Multiplexing Access (CDMA), or existing or future fixed access technologies.

The wireless communications network 100 comprises a first network node 105. The first network node 105 is a node which is normally integrated or embedded into another node. It may also be a stand alone node, but normally, the first network node 105 is an internal node of another node. Examples of such nodes will be described later.

The wireless communications network 100 further comprises a second network node 103. The second network node 103 may be any suitable type of network node capable of communicating with a fourth network node 101 and the first network node 105. In some embodiments, the second network node 103 is the node in which the first network node 105 is integrated or embedded, as illustrated as alternative 1 in FIG. 1.

The second network node 103 may be for example a Mobility Management Entity (MME), a Serving General Packet Radio Service Support Node, (SGSN), a Gateway General Packet Radio Service Support Node (GGSN), a Serving Gateway, (S-GW), a Packet Data Network Gateway, (P-GW), a Machine Type Communication Interworking Function node (MTC IWF), a Base Transceiver Station (BTS), a BSC, a NodeB, a RNC, an eNB and generally in any network node that handles signaling and keeps a user equipment/connection related state. The fourth network node 101 which communicates with the second network node 103 may be a user equipment or any network node, which communicate and sends control signaling to/from the second network node 103.

The user equipment 101 may be any suitable communication device or computational device with communication capabilities capable to communicate with a base station over a radio channel, for instance but not limited to mobile phone, smart phone, Personal Digital Assistant (PDA), laptop, MP3 player or portable DVD player, or similar media content devices, digital camera, electricity meters, home alarms, or even stationary devices such as a Personal Computer (PC). A PC may also be connected via a mobile station as the end station of the broadcasted/multicasted media. The user equipment 101 may also be an embedded communication device in e.g. electronic photo frames, cardiac surveillance equipment, intrusion or other surveillance equipment, weather data monitoring systems, vehicle, car or transport communication equipment, etc.

The communications network 100 may further comprise a third network node 107, which may be a monitoring node such as for example an Operation Support System (OSS) node or an Operations & Maintenance (O&M) node. The third network node 120 may be located in the mobile operator network or in another network e.g. at the node vendor. In some embodiments, the first network node 105 is integrated or embedded in the third network node 107, as illustrated as alternative 2 in FIG. 1.

The embodiments herein handle memory resources and processing resources of the second network node 103 separately. This may also be relevant when it comes to pricing and licensing. This will also mean that traffic models will be less important for the design and hardware composition of nodes.

The existing measures, i.e. registered users, e.g. Simultaneously Attached Users (SAU), and the number of connections, i.e. Packet Data Protocol (PDP) contexts/Packet Data Network (PDN) connections, are kept but tied more to the memory resource utilization in the second network node 103.

The signaling and method steps illustrated in FIG. 1 will be described in detail in relation to FIGS. 2 and 5 below.

Figure 2:
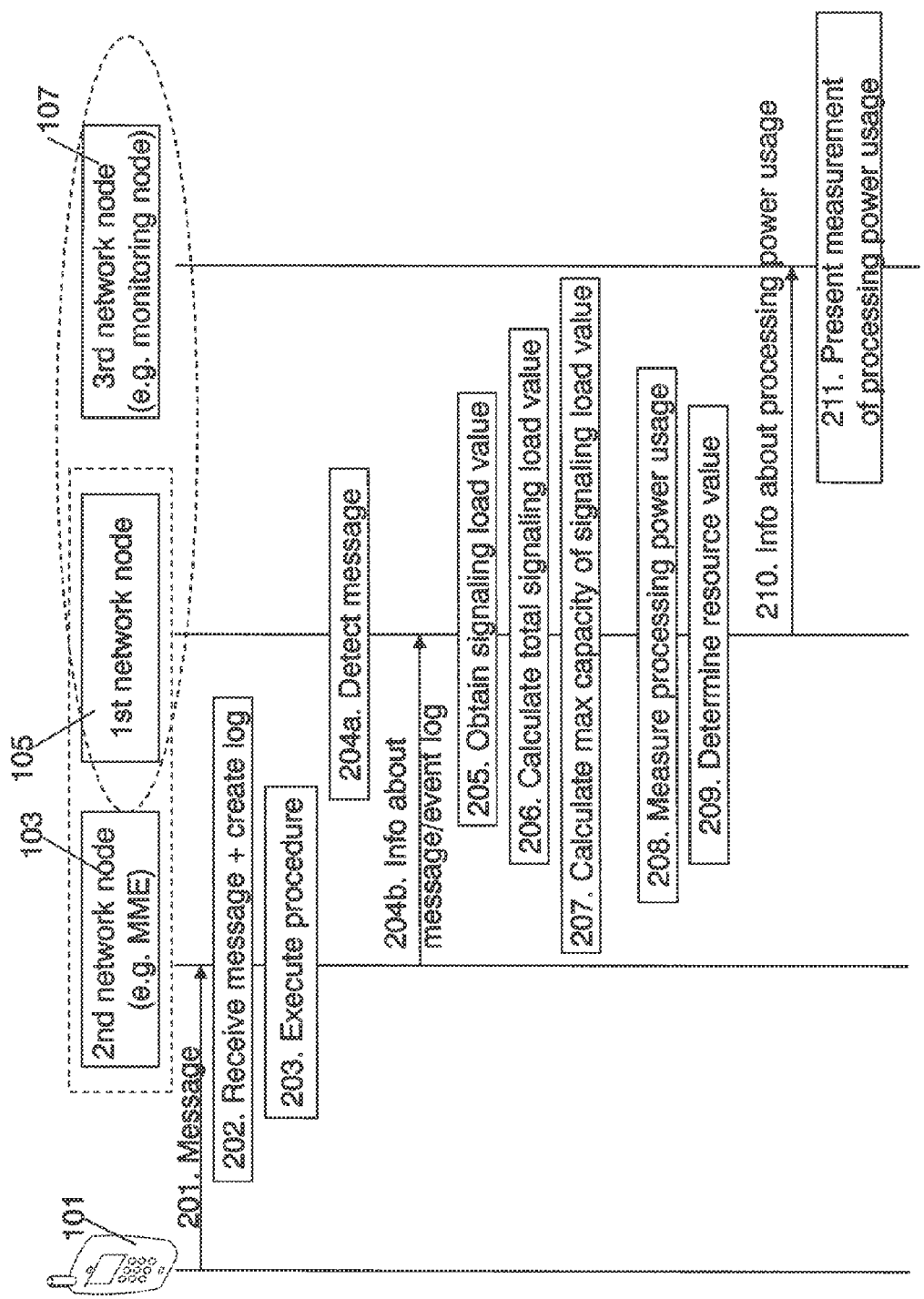
FIG. 2 is a combined schematic block diagram and flowchart depicting embodiments of a method.
Figure 3:
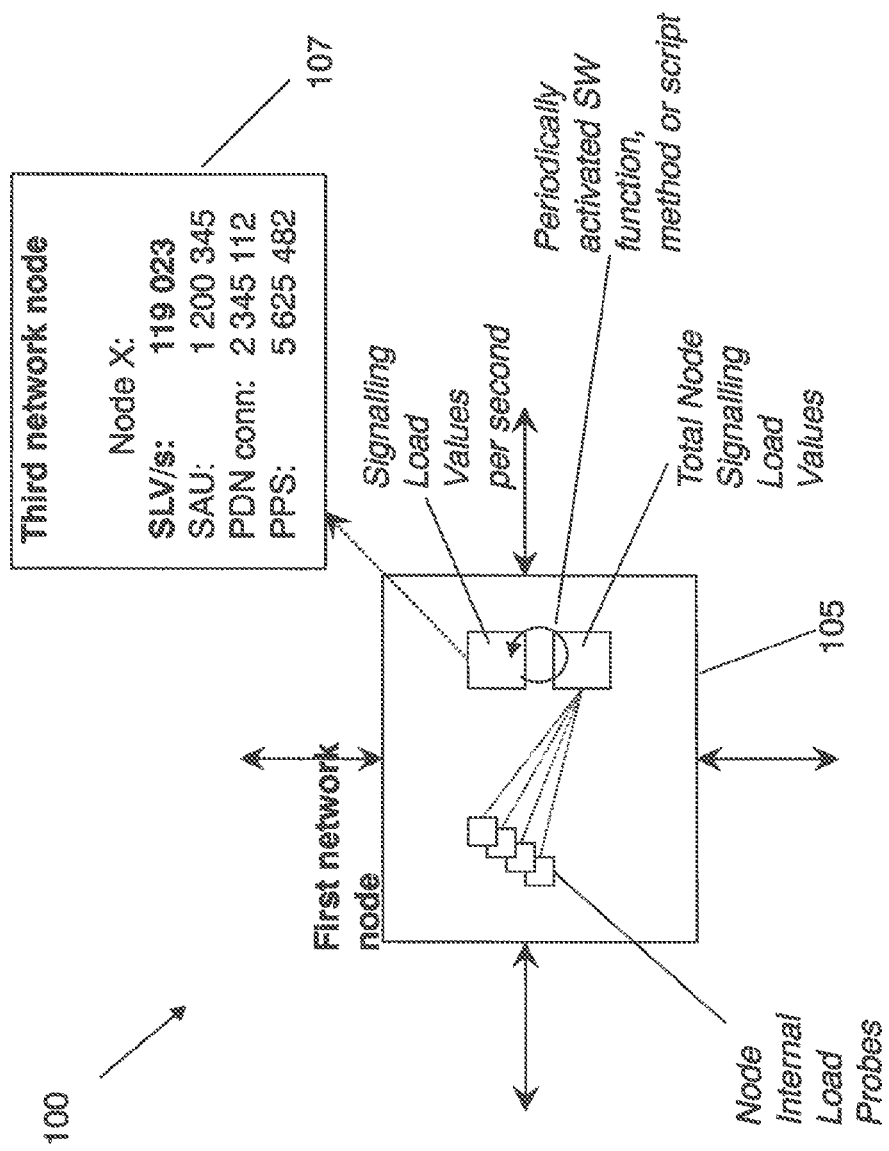
FIG. 3 is a schematic block diagram illustrating embodiments of a communications network.
Figure 4:
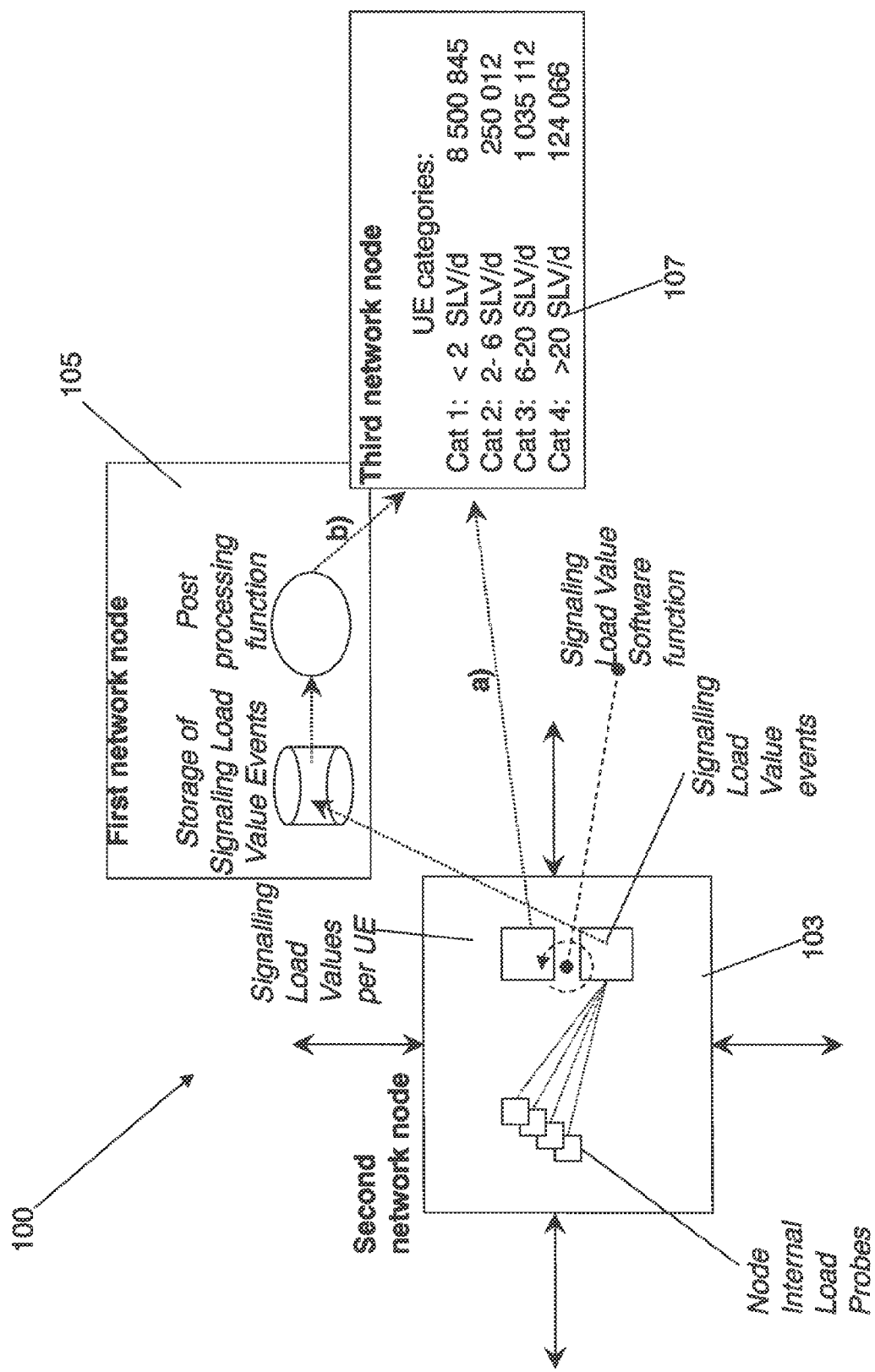
FIG. 4 is a schematic block diagram illustrating embodiments of a communications network.

The method for measuring processing power in the second network node 103 in the communications network 100, according to some embodiments will now be described with reference to the combined signaling diagram and flowchart depicted in FIG. 2 and with reference to FIG. 1, FIG. 3 and FIG. 4 depicting embodiments of the communications network 100. Alternative 1 of FIG. 1 is illustrated using a dotted square in FIG. 2, and alternative 2 of FIG. 1 is illustrated using a dotted circle in FIG. 2. In the following, a user equipment 101 is used as an example for a fourth network node 101. However, instead of a user equipment 101, the node may be any fourth network node 101 configured to communicate with the second network node 103. The second network node 103 may be for example an MME, or any of the node as described above. The method comprises the following steps, which steps may as well be carried out in another suitable order than described below.

Step 201

The user equipment 101 sends a message/signaling to the second network node 103. The message may be referred to as an ingress message. In some embodiments, the message is an attach message, a detach message, a Routing Area Update Request message etc. Further examples of types of messages are exemplified in table 2 and table 3 below.

In some embodiments, a plurality of user equipments 101 sends messages/signaling to the second network node 103.

Step 202

The second network node 103 receives the message sent from the user equipment 101.

In some embodiments, when the first network node 103 is integrated or embedded into the third network node 107, the second network node 105 creates a log comprising all messages received from the user equipment 101. The log is an event log comprising historical data of received user equipment 101 messages. The log is stored in a computer readable memory comprised in the second network node 105.

Step 203

The received message triggers execution of a procedure in the second network node 103. The execution of the procedure requires processing resources, or resources in general from it is initiated until it is finalized in the second network node 103. This may comprise processing resources, bandwidth resources on different interfaces, primary and secondary memory resources, and other physical or virtual resources such as e.g. identifiers, encryption keys, security certificates, IP addresses, etc., that may exist in limited amounts in the second network node 103.

In some embodiments, a message may trigger different procedures. For example, message 1 may trigger procedure A or procedure B.

A procedure may be a series of operations or calculations which have to be executed in the same manner in order to perform a task. A procedure may be executed fully within one node, or parts of the procedure may be executed by other nodes. In the latter case the one node sends specific messages to these other nodes and normally receives responses after some time. In the following, a procedure relates to measurement in the one node only without considering what happens in other nodes. However, measurements from different nodes may in some embodiments be aggregated before presented.

Step 204a

This step corresponds to alternative 1 in FIG. 1.

As mentioned above, in some embodiments, when the first network node 105 is integrated or embedded in the second network node 103, the first network node 105 detects that the second network node 103 has received a message from the user equipment 101.

Step 204b

This corresponds to alternative 2 in FIG. 1, and is an alternative step performed instead of step 204a.

In some embodiments, when the first network node 105 is integrated or embedded in the third network node 107, the second network node 103 sends the stored information about the received message to the first network node 105. As mentioned above, the information about the received messages are in the form of single message information or in the form of multiple messages in the event log stored in a computer readable memory in the first network node 105.

Step 205

The first network node 105 obtains a signaling load value associated with the procedure triggered by the message.

The first network node 105 obtains the signaling load value from a table which is stored in a computer readable memory in the first network node 105. The table is used to translate all messages received at the second network node 103 that have any significant consumption of the processing power/resource in the second network node 103, to an equivalent value called Signaling Load Value (SLV). The signaling load value may also be referred to as Signaling Load Unit (SLU) or signaling equivalent units, and it is tied to the processing power/resource utilization in the second network node 103. An example of a generic translation table is shown in table 1 below.

TABLE 1

Examples of translation of messages and procedures to normalized Signaling Load Values for a second communication node 103

| Ingress Message | Parameter(s) or condition that distinguish procedure | Procedure | Signaling Load Value |
|---|---|---|---|
| Message_1 | Param X = nn | Procedure A | 1 |
| Message_1 | Param X = mm | Procedure B | 0.8 |
| Message_2 | — | Procedure C | 0.2 |
| Message_3 | — | Procedure D | 1.5 |
| Message_4 | — | Procedure E | 0.1 |
| Message_5 | Condition Y is fulfilled | Procedure F | 0.7 |

The left most column comprises different messages received at the second network node 103. The messages may be ingress messages. An ingress message is an incoming message, while an egress message is an outgoing message. The middle right column comprises the procedures associated with and triggered by the received messages. Different messages and signaling processed by the second network node 103 may be compared and summarized based on the amount of processing power/resources they consume in the second network node 103 and hence forming a measure for the signaling load value.

The value in the right most column of table 1, the signaling load value, have been set by the vendor of the second network node 103 or the operator of the second network node 103, to correspond to how much processing power/resources, or power/resources in general, the specific procedure is estimated to consume in the second network node 103 from it is initiated until it is finalized. The signaling load value is an instantaneous relative, i.e. normalized, value, i.e. the load generated by a procedure initiated by a certain message, and optionally with specific parameters or conditions, compared to one specific procedure, e.g. attach, that is used as a reference load. The load may be estimated or measured. A factor may or may not be applied on each value. In another embodiment, procedures are compared not based on processing resources only, but to any second network node resources in general. This may comprise processing resources, bandwidth resources on different interfaces, primary and secondary memory resources, and other physical or virtual resources such as e.g. identifiers, encryption keys, security certificates, IP addresses, etc., that may exist in limited amounts in the second network node 103.

Note, in some cases the same message in the Ingress Message column may trigger different procedures, e.g. see Procedure A & B above. Then additional information such as message parameters or some state information in the second network node 103 is required to determine which "procedure" is executed and hence which signaling load value shall be obtained. One "procedure" may in itself generate several messages on different interfaces to and from other nodes before the procedure is considered finalized, but only the initiating message increases the total signaling load value.

The middle left column comprises the above mentioned parameter(s) or conditions. The table comprises static values which are set beforehand or preconfigured.

In some embodiments, the second network node 103 may be for example a MME node. The MME 103 is responsible for control signaling to and from the user equipments 101 within its geographical service area. Table 2 below shows an example of a table for translation of messages and procedures to normalized load for a MME node 103. Table 3 below shows an example of a table for translation of messages and procedures to normalized load where the second network node 103 is exemplified as an SGSN node 103. Note, the values, messages and procedures are only examples. In principle all messages that initiate procedures that consume significant node processing resources would be comprised in the translation table.

TABLE 2

Examples of translation of messages and procedures to normalized Signaling Load Values in the MME node 103

| Ingress Message | Parameter(s) or condition that distinguish procedure | Procedure | Signaling Load Values |
|---|---|---|---|
| Attach request | | Initial Attach | 1 |
| Detach request, Detach notification, Cancel Location, or MME implicit detach event | | UE-Initiated Detach, MME-Initiated Detach, SGSN-Initiated Detach with ISR activated, or HSS-Initiated Detach | 0.9 |
| Tracking Area Update Request | | Tracking Area Update with or without S-GW change | 0.2 |
| Context Request | | Tracking Area Update (old MME), RA Update with MME interaction with or without S-GW change | 0.6 |
| Handover Required | | Intra-E-UTRAN S1-based Handover (source MME), E-UTRAN to UTRAN Inter RAT Handover, or E-UTRAN to GERAN Inter RAT Handover, | 1.3 |
| Forward Relocation Request | | Intra-E-UTRAN S1-based Handover (target MME), UTRAN to E-UTRAN Inter RAT Handover, or GERAN to E-UTRAN Inter RAT Handover | 1.3 |
| PDN Connectivity Request | | UE Requested PDN Connectivity | 0.5 |
| PDN Disconnection Request, or MME internal PDN disconnection trigger | | UE or MME Requested PDN Disconnection | 0.4 |
| Create Bearer Request | | Dedicated Bearer Activation | 0.3 |
| Update Bearer Request, Insert Subscriber Data, or Request Bearer Resource Modification | For Insert Subscriber Data, if UE-AMBR or APN-AMBR is changed | Bearer Modification | 0.2 |
| Delete Bearer Request, or MME internal Dedicated Bearer Deactivation | | Bearer Deactivation | 0.2 |
| Service Request, or Downlink Data Notification | | UE or Network Triggered Service Request | 0.2 |
| S1 UE Context Release Request | | S1 Release Procedures | 0.1 |

TABLE 3

Examples of translation of messages and procedures to normalized Signaling Load Values in the SGSN node 103

| Ingress Message | Parameter(s) or condition that distinguish procedure | Procedure | Signaling Load Values |
|---|---|---|---|
| Attach request | | GPRS Attach, Combined GPRS/IMSI Attach | 1 |

TABLE 3-continued

Examples of translation of messages and procedures to normalized Signaling Load Values in the SGSN node 103

| Ingress Message | Parameter(s) or condition that distinguish procedure | Procedure | Signaling Load Values |
|---|---|---|---|
| Detach request | | MS-Initiated Detach or Network-Initiated Detach | 0.8 |
| Routing Area Update Request | Old RAI is served by the current node and the MS/UE is not PMM-Connected | Intra SGSN Routing Area Update, Combined Intra SGSN LA/RA update, or Periodic RA (and LA) Update | 0.1 |
| Routing Area Update Request | Old RAI is served by a different node and the MS/UE is not PMM-Connected | Inter SGSN Routing Area Update, Combined Inter SGSN LA/RA update | 0.7 |
| Routing Area Update Request or SGSN Context Request | The MS/UE is in PMM-Connected state | Inter-system Change (Intra-SGSN or Inter-SGSN) | 1.1(Note 1) |
| Relocation Required or Forward Relocation Request | | Serving RNS Relocation Procedure, Combined Hard Handover and SRNS Relocation Procedure, and Combined Cell/URA Update and SRNS Relocation Procedure | 1.3(Note 1) |
| Enhanced Relocation Complete Request | | Enhanced Serving RNS Relocation | 0.3 |
| PS Handover Required | Target Cell Identifier is served by the current SGSN | Intra/Inter BSS and Intra SGSN PS Handover Procedure | 0.7 |
| PS Handover Required or Forward Relocation Request | For 'PS Handover Required' only: Target Cell Identifier is served by a different SGSN | Inter SGSN and Inter RAT PS Handover Procedure | 0.8(Note 1) |
| Activate PDP Context Request, Activate Secondary PDP Context Request, or Initiate PDP Activation Context Request | | PDP Context Activation, Secondary PDP Context Activation, Network Request PDP Context Activation | 0.5 |
| Deactivate PDP Context Request, Delete PDP Context Request, or Delete Bearer Request | | Deactivation procedures | 0.4 |
| Modify PDP Context Request, Update PDP Context Request or Update Bearer Request | | Modification procedures | 0.1 |
| Service Request | | MS, UE or Network Initiated service Request | 0.2 |
| RAB Release Release Request, or Iu Release Request | | Release Procedures | 0.1 |
| Paging Request | | CS paging | 0.1 |

(Note 1): Signaling Load Values to be incremented in both target and source SGSN The first network node 105 uses the table to find the signaling load value that corresponds to or matches the detected received message and triggered procedure. In some embodiments, the received message and triggered procedure may fulfill conditions or parameters set in the message, as shown in the middle left column of tables 1, 2 and 3 above. Returning to FIG. 2.

Step 206

Each time the first network node 105 detects a message or receives information about historical messages that matches one of the rows in the translation table and optionally any specific parameter(s) or condition(s), it increases a parameter called total signaling load value for the second network node 103 with the value found in the rightmost column of tables 1, 2 and 3. The total signaling load value may be referred to as the first total signaling load value.

In the example of table 1, the total signaling load value is:

Total Signaling Load Value=SLV(message_1)+SLV(message_2)+SLV(message 3)+SLV(message_4)+SLV(message_5)=1+0.8+0.2+1.5+0.1+0.7=4.3

In order to get an instantaneous signaling load value, the total signaling load value is read periodically, e.g. once per second, by a software function, method or script in the first network node 105, and the difference between the new and the previous value is divided by the elapsed time. The software function is illustrated in FIGS. 3 and 4. The total signaling load value for a time interval may be referred to as the second total signaling load value or a total signaling load value rate per time interval:

$$SecondTotalSignalingLoadValue = \frac{SignalingLoadValue\ (t2) - SignalingLoadValue\ (t1)}{t2 - t1},$$

where t1 is the time when the previous value is measured and t2 is the time when the new value is measured.

In some embodiments, the first network node 105 measures and/or monitors the number of signaling load value per user equipment 101. When the signaling load value is measured per user equipment 101, the measurement may be presented for a different time period than for the second network node total e.g. the signaling load per day for the user equipment 101 instead of signaling load per second for the second network node 103 in total. The measurement may be done completely within the first network node 105, outside the first network node 105, e.g. based on event notifications, or a combination of the both. In some embodiments, it may be created in real time or as post processing from collected statistics.

The per user equipment signaling load value rate, may be for one, several or all user equipments 101 in the network 100. The user equipments 101 may be grouped into different categories depending on what signaling load they generate in the second network node 103/network 100. For example, different categories may be user equipments 101 generating 0-1.9 SLV/day, 2.0-5.9 SLV/day, 6.0-20 SLV/day or 21 or more SLV/day. Understanding what categories of user equipments 101 there are in a second network node 103 or network 100 may make network planning easier. For example, if and how much network capacity needs to be expanded if a contract of 10 million M2M devices of category 0-1.9 SLV/day is being negotiated.

Other parameters than signaling load value may be used in creating the categories, e.g. the amount of mobility signaling, e.g. to differentiate stationary devices, time of day when active, e.g. service requests during peak load hours or during low peak hours etc. These parameters may be extracted from the event information, e.g. messages/signals, that are the base for the SLV calculation method.

The total signaling load value may also be calculated per procedure executed in the second network node 103.

Step 207

The first network node 105 may determine or calculate a maximum signaling load value capacity of the second network node 103 if the number of received messages is increased until a maximum processing power capacity of the second network node 103 is reached, e.g. the CPU of the second network node 103 are at max capacity or any other suitable criteria. The maximum signaling load value capacity is a measure of how much signaling load values the second network node 103 is able to handle per time interval, e.g. second, i.e. based on its amount of available processing power.

Step 208

The first network node 105 measures processing power in the second network node 103 based on the signaling load value. The measurement may be of processing power usage in the second network node 103. It may be based on one signaling load value, the different alternatives of total signaling load value, the maximum signaling load value capacity etc. If the signaling load value comes close to, reaches or passes an upper limit, the second network node 103 capacity, i.e. processing power, needs to be increased e.g. to deploy more of the resource that is missing.

Step 209

The first network node 105 determines or calculates a resource value based on the measured processing power. It may also be associated with the determined maximum signaling load value capacity of the second network node 103. The resource value may further be based on the different types total signaling load value described in step 206.

Step 210

The first network node 105 sends or communicates information about the signaling load value and the total signaling load value, both per second network node 103, per user equipment 101, per procedure and per time interval, or a combination of these, the processing power and the processing power usage to the third network node 107. The third network node 107 may be a monitoring node such as an OSS or other O&M node located at the operator. The information may in addition be communicated to the vendor of the second network node 103 for statistical and/or licensing purposes.

Based on the separation of memory resources and processing resources, a formula for a flexible dimensioning model may be expressed. In some embodiments, a flexible price/license model may also be expressed.

The existing measures, i.e. registered users (SAU) and number of connections, are kept but tied more to the memory resource utilization in the second network node 103.

Step 211

The third network node 107 monitors, processes and presents the received information about the measurements of processing power and processing power usage from the first network node 105. The measurements may be unified measurements in case a plurality of messages of different types is received. The total number of signaling load values in a second network node 103 may be measured and monitored at any given moment and statistics collected. The owner and/or the vendor of the second network node 103 may use the measurements/statistics to verify that the signaling load value measured doesn't pass its upper limit. If the signaling load value passes its upper limit, the second network node 103 capacity, i.e. processing power, may need to be increased e.g. to deploy more of the resource that is missing. By this, a tool for fair pricing/licensing that may be flexible to also accommodate the wildly different communication patters for many M2M applications may be obtained.

When the first network node 105 is integrated in the second network node 103, illustrated as alternative 1 in FIG. 1, the third network node 107 may receive its input data directly from the first network node 103. This is also illustrated in FIG. 3.

When the first network node is integrated din the third network node 107, illustrated as alternative 2 in FIG. 1, the second network node 103 creates, as mentioned above, an event log of messages and signaling load value events. This log is provided to the first network node 105, which may also be referred to as a post processing node. The first network node 105 stores the received signaling load value events and performs post processing of the stored data. This is also illustrated in FIG. 4. The post processing may for example be beneficial when data from several or all nodes in the network 100 shall be monitored and presented or when the categorization needs to be more advanced e.g. comprising other parameters than signaling load value, e.g. mobility signaling, active time-of-day etc.

In some embodiments, the price for a second network node 103 may be calculated using a model where the Signaling Load Value (SLV) affects the price independently from the Simultaneously Attached Users (SAU) for example using a base formula as this. PDP Context/PDN Connections may replace SAU e.g. for GGSN/PGW.

Node Price=x*SAU+y*SLV/s+z*PPS x may e.g. be measured in SEK/SAU y may e.g. be measured in SEK/SLV/s z may e.g. be measured in SEK/PPS In a simplified example to illustrate the price model, using a second network node 103 exemplified as an MME, the prices of two different MME nodes 103 are calculated. One MME 103 dimensioned for normal and smart phone usage, referred to as MME__1, and a second MME 103 dimensioned for a dominant portion of low activity M2M devices, referred to as MME__2.

The following prices are used in the example: x=0.1 SEK/SAU, y=900 SEK/SLV/s, z=0.01 SEK/PPS. The following illustrative assumptions are made on the node dimensioning. Note that the values in these examples and assumptions are only explanatory and are not necessarily used in real products or deployments:

MME__1 103 is dimensioned for 1 M SAU, and MME__2 103 is dimensioned for 10 M SAU;

deduced from traffic models it is assumed that an attached normal/smart phone users need 0.001 SLV/s;

low activity M2M devices are optimized and generate less than one tenth of the signaling load of normal/smart phone users, i.e. 0.0001 SLV/s;

An MME 103 does not have any packet forwarding capacity;

The price for a "normal" MME__1 103 of 1 M SAU would then be:

Node Price MME__1=0.1*10E6+900*10E6*10E-3+0.01*0=1 MSEK

The price for "M2M tailored" MME__2 of 10 M SAU would then be:

Node Price MME__2=0.1*10E7+900*10E7*10E-4+0.01*0=1.9 MSEK

Note that an operator that buys an M2M tailored MME 103 of 10 M SAU as in the example above and uses it for solely normal/smart phone users, would still only be able to serve approximately 1 M SAU due to the limiting signaling capacity, i.e. SLV/s.

One particular use of the price model is a when the node price is solely based on SLV/s, i.e. x and z above are set to 0.

The method described above will now be described seen from the perspective of the first network node 105. FIG. 5 is a flowchart describing the present method in the first network node 105 for measuring processing power in a second network node 103 in the communications network 100. In some embodiments, the measurement of processing power is a unified measurement valid for different types of messages. Unified refers to making or uniting something into one unit or a coherent whole. In some embodiments, the second network node 103 is a Mobility Management Entity, referred to as MME, a Serving General Packet Radio Service Support Node, referred to as SGSN, a Gateway General Packet Radio Service Support Node, referred to as GGSN, a Serving Gateway, referred to as S-GW, a Packet Data Network Gateway, referred to as P-GW, a Machine Type Communication Interworking Function node, referred to as MTC IWF and the third network node 107 is a monitoring node 107. In some embodiments, the fourth network node 101 is a user equipment 101 or a fourth network node configured to communicate with the second network node 103. The method comprises the steps to be performed by the first network node 105:

Step 501

This step corresponds to step 202 and 204a in FIG. 2.

In some embodiments, the first network node 105 is comprised in the second network node 103. In some embodiments, the first network node 105 detects receipt of a message from a fourth network node 101. The message may be of different types.

In some embodiments, the received message fulfils a predetermined condition.

Step 502

This step corresponds to step 203 in FIG. 2. This is a step which is performed after step 501.

In some embodiments, the first network node 105 is comprised in the second network node 103. In some embodiments, the first network node 105 executes the procedure triggered by the received message.

In some embodiments, the procedure executed in the second network node 103 is decided by the received message together with one or more predetermined conditions and/or one or more parameters in the message.

Step 503

This step corresponds to step 204b in FIG. 2. This step is performed instead of steps 501 and 502.

In some embodiments, the first network node 105 is comprised in a third network node 107. In some embodiments, the first network node 105 receives information about the message from the second network node 103. The message is sent from a fourth network node 101 to the second network node 103.

Step 504

This step corresponds to step 205 in FIG. 2.

The first network node 105 obtains a signaling load value associated with a procedure. The procedure is triggered by a message.

In some embodiments, the signaling load value associated with the procedure is preconfigured in the first network node 105.

In some embodiments, the signaling load value is further associated with consumption of an amount of processing power/resources when the procedure is executed in the second network node 103.

In some embodiments, the signaling load value, information about the message, conditions and parameters associated with the procedure, and information about the signaling load value associated with the procedure is stored in a table in the first network node 105. In some embodiments, the signaling load value is obtained from the table.

Step 505

This step corresponds to step 206 in FIG. 2. In some embodiments, the first network node 105 adds the obtained signaling load value to a first total signaling load value.

In some embodiments, the first total signaling load value is per fourth network node 101, per procedure executed in the second network node 103, per time interval or any combination of these.

Step 506

This step corresponds to step 207 in FIG. 2.

In some embodiments, the first network node 105 determines a maximum capacity of signaling load value of the second network node 103 by increasing a number of received messages until a maximum capacity of processing power of the second network node 103 is reached. The maximum capacity of signaling load value may also be referred to as maximum signaling load value capacity.

Step 507

This step corresponds to step 209 in FIG. 2.

In some embodiments, the first network node 105 determines a resource value associated with the determined maximum capacity of signaling load value of the second network node 103.

Step 508

This step corresponds to step 206 in FIG. 2.

In some embodiments, the first network node 105 determines a second total signaling load value per fourth network node 101 and per time period.

Step 509

This step corresponds to step 206 in FIG. 2. This step is performed after step 508.

In some embodiments, the first network node 105 establishes a category of fourth network node 101 based on the second total signaling load value. The category of fourth network node 101 and the understanding of the number of fourth network nodes 101 of different categories in a network facilitate and/or enables network planning and dimensioning of the communications network 100.

Step 510

This step corresponds to step 210 in FIG. 2.

In some embodiments, the first network node 105 sends information about the first total signaling value and the second total signaling load value to a third network node 107.

Step 511

This step corresponds to step 208 in FIG. 2.

The first network node 105 measures the processing power of the second network node 103 based on the obtained signaling load value.

In some embodiments, the measurement of the processing power in the second network node 103 is further based on the total signaling load value. As mentioned above, the message may be of different types. The measurement of processing power based on the total signaling load values may therefore be a unified measurement of processing power. Unified indicates that the measurement of processing power is independent of the different types of messages, and that it is one measurement of all types of messages.

In some embodiments, the measurement of the processing power of the second network node 103 is further based on the determined maximum capacity of signaling load value.

Figure 5:
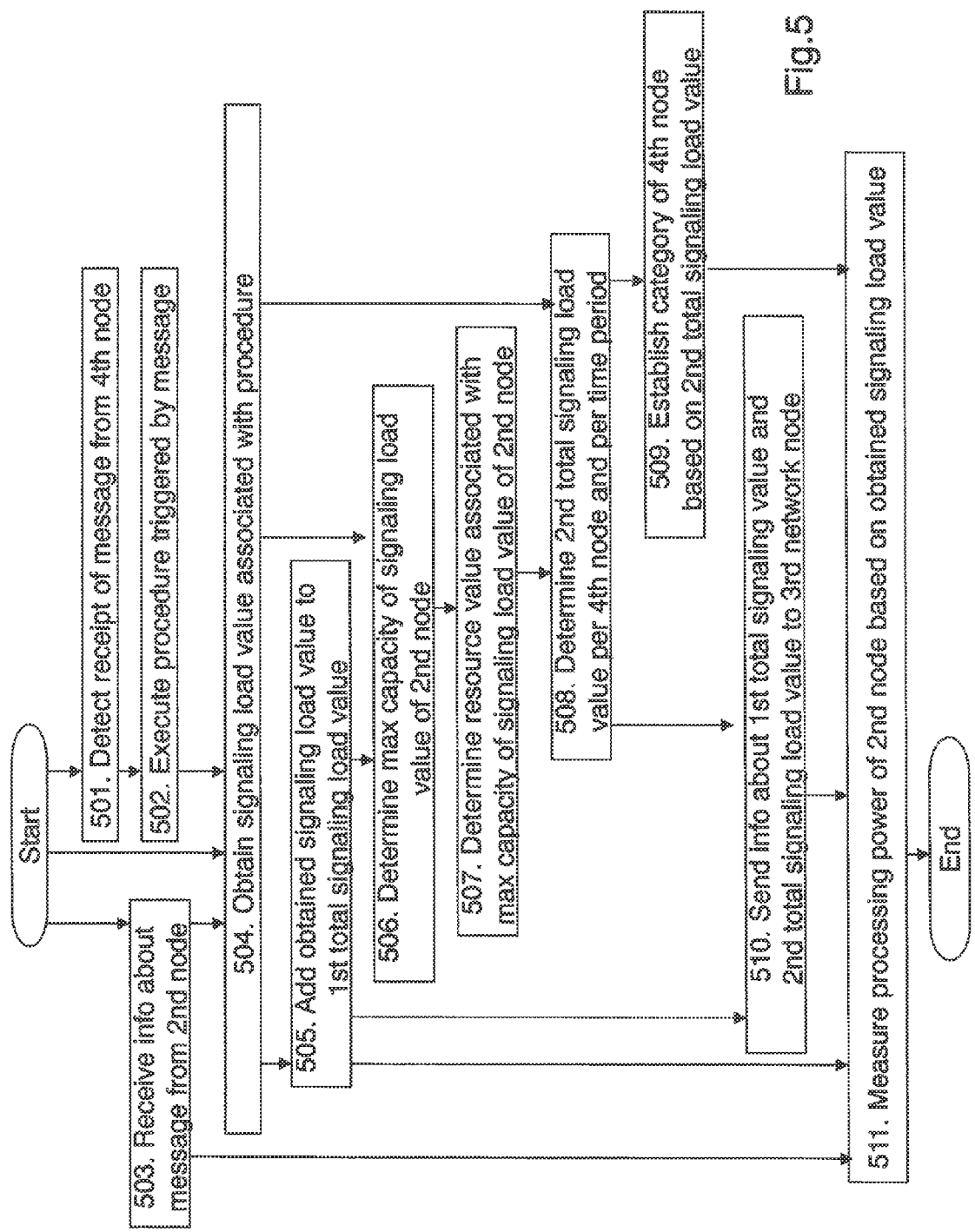
FIG. 5 is a flow chart illustrating embodiments of a method.
Figure 6:
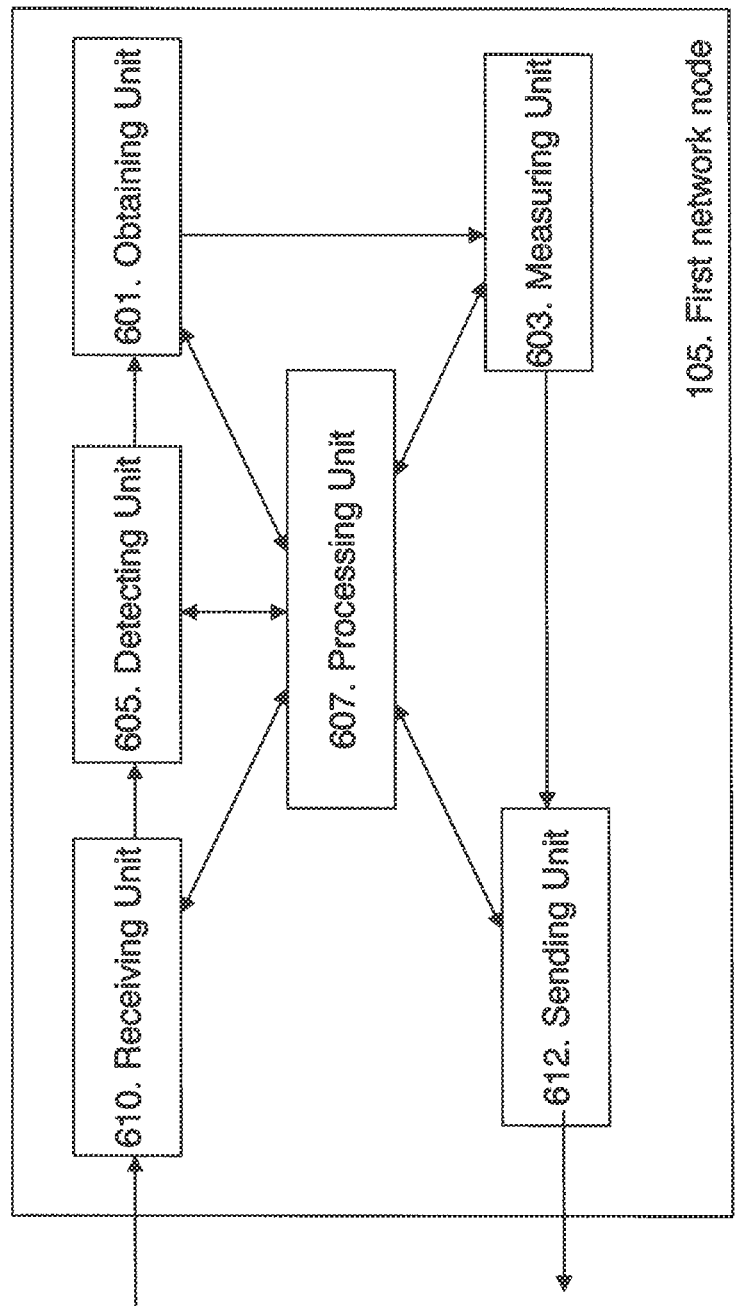
FIG. 6 is a schematic block diagram illustrating embodiments of a first network node The drawings are not necessarily to scale and the dimensions of certain features may have been exaggerated for the sake of clarity. Emphasis is instead placed upon illustrating the principle of the embodiments herein.

To perform the method steps shown in FIG. 5 for measuring processing power in a second network node 103 in a communications network 100, the first network node 105 comprises a first network node arrangement as shown in FIG. 6. In some embodiments, the second network node 103 is a Mobility Management Entity, referred to as MME, a Serving General Packet Radio Service Support Node, referred to as SGSN, a Gateway General Packet Radio Service Support Node, referred to as GGSN, a Serving Gateway, referred to as S-GW, a Packet Data Network Gateway, referred to as P-GW, a Machine Type Communication Interworking Function node, referred to as MTC IWF and the third network node 107 is a monitoring node 107. In some embodiments, the fourth network node 101 is a user equipment 101 or a fourth network node configured to communicate with the second network node 103.

The first network node 105 comprises an obtaining unit 601 configured to obtain a signaling load value associated with a procedure. The procedure is triggered by a message. In some embodiments, the signaling load value associated with the procedure is preconfigured in the first network node 105. In some embodiments, the signaling load value is further associated with consumption of an amount of processing power/resources when the procedure is executed in the second network node 103. In some embodiments, signaling load value, information about the message, conditions and parameters associated with the procedure and information about the signaling load value associated with the procedure is stored in a table in the first network node 105. In some embodiments, the signaling load value is obtained from the table.

The first network node 105 further comprises a measuring unit 603 which is configured to measure of the processing power of the second network node 103 in the communications network 100 based on the obtained signaling load value. In some embodiments, the measuring unit 603 is further configured to measure the processing power in the second network node 103 further based on the first total signaling load value. In some embodiments, the measuring unit 603 is further configured to measure the processing power of the second network node 103 further based on the determined maximum capacity of signaling load value.

In some embodiments, where the first network node 105 is comprised in the second network node 103, the first network node 105 comprises a detecting unit 605 configured to detect receipt of a message from a fourth network node 101, and a processing unit 607 configured to execute the procedure triggered by the message. In some embodiments, the procedure executed in the second network node 103 is decided by a received message together with one or more predetermined conditions and/or one or more parameters in the message. In some embodiments, the processing unit 607 is further configured to add the obtained signaling load value to a first total signaling load value. In some embodiments, the total signaling load value is per fourth network node 101, per procedure executed in the second network node 103, per time interval, or a combination of these. In some embodiments, the processing unit 607 is further configured to determine a maximum signaling load value capacity of the second network node 103 by increasing a number of received messages until a maximum capacity of processing power of the second network node 103 is reached. In some embodiments, the processing unit 607 is further configured to determine a resource value associated with the determined maximum capacity of signaling load value of the second network node 103. In some embodiments, the processing unit 607 is further configured to determine a second total signaling load value per fourth network node 101 and per time period and to establish a category of fourth network node 101 based on the second total signaling load value. In some embodiments, the category of fourth network node 101 enables network planning and dimensioning of the communications network 100.

In some embodiments, where the first network node 105 is comprised in a third network node 107, the first network node 105 comprises a receiving unit 610 configured to receive information about the message from the second network node 103. The message is sent from a fourth network node 101 to the second network node 103. In some embodiments, the received message fulfils a predetermined condition In some embodiments, the first network node 105 further comprises a sending unit 612 configured to send information about the first total signaling load value and the second total signaling load value to a third network node 107.

The present mechanism for measuring processing power in a second network node 103 in a communications network 100 may be implemented through one or more processors, such as the processing unit 607 in the first network node arrangement depicted in FIG. 6, together with computer program code for performing the functions of the embodiments herein. The processor may be for example a Digital Signal Processor (DSP), Application Specific Integrated Circuit (ASIC) processor, Field-programmable gate array (FPGA) processor or micro processor. The program code mentioned above may also be provided as a computer program product, for instance in the form of a data carrier carrying computer program code for performing the embodiments herein when being loaded into the first network node 105. One such carrier may be in the form of a CD ROM disc. It is however feasible with other data carriers such as a memory stick. The computer program code may furthermore be provided as pure program code on a server and downloaded to the first network node 105 remotely.

The embodiments herein are not limited to the above described preferred embodiments. Various alternatives, modifications and equivalents may be used. Therefore, the above embodiments should not be taken as limiting the scope of the embodiments, which is defined by the appending claims.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

It should also be emphasized that the steps of the methods defined in the appended claims may, without departing from the embodiments herein, be performed in another order than the order in which they appear in the claims.

The invention claimed is:

1. A method for generating information about a network node's processing power usage, the method comprising:
receiving, at the network node a first message transmitted by a first wireless communication device;
in response to receiving the first message, the network node performing at time t1 a first procedure triggered by the first message;
obtaining a first signaling load value (SLV1) associated with the first procedure;
retrieving a first total signaling load value (Total-SLV1);
updating the first total signaling load value by calculating Total1=Total-SLV1+SLV1;
storing the updated first total signaling load value (Total1);
receiving, at the network node a second message transmitted by a second wireless communication device;
in response to receiving the second message, the network node performing at time t2 a second procedure triggered by the second message;
obtaining a second signaling load value (SLV2) associated with the second procedure;
retrieving a second total signaling load value (Total-SLV2), where Total-SLV2 is equal to the updated first total signaling load value (Total1) plus zero or more signaling load values corresponding to procedures performed by the network node subsequent to the network node performing the first procedure and prior to the network node performing the second procedure;
calculating Total2=Total-SLV2+SLV2;
calculating (Total2−Total1)/(t2−t1); and
measuring the processing power usage of the network node based on Total2.

2. The method according to claim 1, further comprising:
receiving information about the first and second message from a fourth network node.

3. The method according to claim 1, wherein the first total signaling load value is at least one of per fourth network node, per procedure executed in the second network node and per time interval.

4. The method according to claim 1, further comprising:
determining a maximum capacity of the network node by increasing a number of received messages until a maximum capacity of processing power of the network node is reached, wherein the maximum capacity is indicated by a signaling load value; and
wherein the measuring the processing power of the network node is further based on the determined maximum capacity.

5. The method according to claim 4, further comprising: determining a resource value associated with the determined maximum capacity of the network node.

6. The method according to claim 1, further comprising:
establishing a category of fourth network node based on the second total signaling load value; and
wherein the category of fourth network node enables network planning and dimensioning of the communications network.

7. The method according to claim 1, further comprising:
sending information about the first total signaling load value (Total-SLV1) and the second total signaling load value (Total-SLV2) to a third network node.

8. The method according to claim 1, wherein the first signaling load value associated with the first procedure is preconfigured.

9. The method according to claim 1, wherein the received first message fulfils a predetermined condition.

10. The method according to claim 1, wherein the first signaling load value is further associated with consumption of an amount of processing power when the first procedure is performed in the network node.

11. The method according to claim 1, wherein information about the first message, conditions and parameters associated with the first procedure and information about the first signaling load value associated with the first procedure is stored in a table, and wherein the first signaling load value is obtained from the table.

12. The method according to claim 1, wherein the network node is a Mobility Management Entity, MME, a Serving General Packet Radio Service Support Node, SGSN, a Gateway General Packet Radio Service Support Node, GGSN, a Serving Gateway, S-GW, a Packet Data Network Gateway, P-GW, a Machine Type Communication Interworking Function node, MTC IWF.

13. A first network node for generating information about a network node's processing power usage, the first network node comprising:
   a processor and a memory coupled to the processor, wherein the processor is configured to:
   receive, at the network node, a first message transmitted by a first wireless communication device;
   in response to receiving the first message, perform at time t1 a first procedure triggered by the first message;
   obtain a first signaling load value (SLV1) associated with the first procedure;
   retrieve a first total signaling load value (Total–SLV1);
   update the first total signaling load value by calculating Total1=Total–SLV1+SLV1;
   store the updated first total signaling load value (Total1);
   receive, at the network node a second message transmitted by a second wireless communication device;
   in response to receiving the second message, perform at time t2 a second procedure triggered by the second message;
   obtain a second signaling load value (SLV2) associated with the second procedure;
   retrieve a second total signaling load value (Total-SLV2), where Total-SLV2 is equal to updated first total signaling load value (Total1) plus zero or more signaling load values corresponding to procedures performed by the network node subsequent to the network node performing the first procedure and prior to the network node performing the second procedure;
   calculating Total2=Total–SLV2+SLV2;
   calculating (Total2–Total1)/(t2–t1); and
   measure the processing power usage of the network node based on Total2.

14. The first network node according to claim 13 wherein the processor is further configured to:
   receive information about the first message from a fourth network node.

15. The first network node according to claim 13, wherein the first total signaling load value is at least one of per fourth network node, per procedure executed in the second network node and per time interval.

16. The first network node according to claim 13, wherein the processor is further configured to determine a maximum capacity of the network node by increasing a number of received messages until a maximum capacity of processing power of the network node is reached, wherein the maximum capacity is indicated by a signaling load value; and wherein the processor is further configured to measure the processing power of the network node further based on the determined maximum capacity.

17. The first network node according to claim 16, wherein the processor is further configured to determine a resource value associated with the determined maximum capacity of the network node.

18. The first network node according to claim 13, wherein the processor is further configured to: establish a category of fourth network node based on the second total signaling load value; wherein the category of fourth network node enables network planning and dimensioning of the communications network.

19. The first network node according to claim 13, wherein the processor is further configured to:
   send information about a first total signaling value and a second total signaling load value to a third network node.

20. The first network node according to claim 13, wherein the first signaling load value associated with the first procedure is preconfigured.

21. The first network node according to claim 13, wherein the received first message fulfils a predetermined condition.

22. The first network node according to claim 13, wherein the first signaling load value is further associated with consumption of an amount of processing power when the first procedure is performed in the network node.

23. The first network node according to claim 13, wherein information about the first message, conditions and parameters associated with the first procedure and information about the first signaling load value associated with the procedure first is stored in a table, and wherein the processor is further configured to obtain the signaling load value from the table.

24. The first network node according to claim 13, wherein the network node is a Mobility Management Entity, MME, a Serving General Packet Radio Service Support Node, SGSN, a Gateway General Packet Radio Service Support Node, GGSN, a Serving Gateway, S-GW, a Packet Data Network Gateway, P-GW, a Machine Type Communication Interworking Function node, MTC IWF.

25. The method of claim 1, wherein the first wireless communication device is the same as the second wireless communication device, whereby measuring the processing power usage results in measuring the processing power usage associated with the first wireless communication device.

* * * * *

UNITED STATES PATENT AND TRADEMARK OFFICE
CERTIFICATE OF CORRECTION

| | | |
|---|---|---|
| PATENT NO. | : 9,143,948 B2 | Page 1 of 1 |
| APPLICATION NO. | : 13/598973 | |
| DATED | : September 22, 2015 | |
| INVENTOR(S) | : Ronneke et al. | |

It is certified that error appears in the above-identified patent and that said Letters Patent is hereby corrected as shown below:

On the Title Page, in Column 1, below item (65), insert -- (30) Foreign Application Priority Data PCT/EP2011/064899 (EPO)............. Aug. 30, 2011 --.

In the specification

In Column 7, Line 10, delete "node 103" and insert -- node 105 --, therefor.

In Column 7, Line 12, delete "node 105" and insert -- node 103 --, therefor.

In Column 7, Line 16, delete "node 105." and insert -- node 103. --, therefor.

In Column 12, Line 65, delete "(message 3)" and insert -- (message_3) --, therefor.

In Column 14, Line 66, delete "node 103." and insert -- node 105. --, therefor.

In the claims

In Column 20, Line 29, in Claim 2, delete "message" and insert -- messages --, therefor.

Signed and Sealed this
Fifth Day of April, 2016

Michelle K. Lee
*Director of the United States Patent and Trademark Office*